(12) United States Patent
Fumagalli et al.

(10) Patent No.: US 11,378,393 B2
(45) Date of Patent: Jul. 5, 2022

(54) METHOD AND APPARATUS FOR MEASURING THE STRAIGHTNESS ERROR OF SLENDER BODIES, WITH COMPENSATION OF GRAVITY DEFORMATION

(71) Applicant: Q-TECH S.R.L., Flero (IT)

(72) Inventors: Luca Fumagalli, Flero (IT); Paolo Tomassini, Flero (IT); Diego Tosi, Flero (IT); Erika Gregorelli, Flero (IT)

(73) Assignee: Q-TECH S.R.L, Flero (IT)

( * ) Notice: Subject to any disclaimer, the term of this patent is extended or adjusted under 35 U.S.C. 154(b) by 149 days.

(21) Appl. No.: 16/759,085

(22) PCT Filed: Oct. 26, 2018

(86) PCT No.: PCT/IB2018/058359
§ 371 (c)(1),
(2) Date: Apr. 24, 2020

(87) PCT Pub. No.: WO2019/082134
PCT Pub. Date: May 2, 2019

(65) Prior Publication Data
US 2020/0340805 A1 Oct. 29, 2020

(30) Foreign Application Priority Data

Oct. 27, 2017 (IT) .................. 102017000122452

(51) Int. Cl.
*G01B 5/00* (2006.01)
*G01B 21/04* (2006.01)
*G01B 11/27* (2006.01)

(52) U.S. Cl.
CPC .......... *G01B 11/272* (2013.01); *G01B 5/0016* (2013.01); *G01B 21/045* (2013.01)

(58) Field of Classification Search
CPC .. G01B 11/272; G01B 5/0016; G01B 21/045; G01B 15/06; G01B 15/08
(Continued)

(56) References Cited

U.S. PATENT DOCUMENTS 4,306,435 A * 12/1981 Galdabini ................ B21D 3/10
72/16.2
4,949,565 A * 8/1990 Kodera .................... B21D 3/10
72/18.1
(Continued)

FOREIGN PATENT DOCUMENTS

EP 1447645 A1 8/2004
EP 3093611 A2 11/2016
(Continued)

*Primary Examiner* — Isiaka O Akanbi
(74) *Attorney, Agent, or Firm* — Volpe Koenig (57) ABSTRACT

An apparatus and a relative method for measuring straightness errors of elongated-shape elements, such as bars, tubes and the like is presented. The measuring apparatus includes a supporting system for a bar, a first detecting system having one or more first sensors to detect the development of the longitudinal axis of the bar, and a central control unit. The measuring apparatus further includes a second detecting system provided with a plurality of second sensors to detect the forces the bar applies to the supporting system and acquiring means to acquire at least one physical parameter of the bar under measuring. The central control unit includes at least one data acquiring and processing module to acquire and process the data detected by said first and second detecting systems and acquired by said acquiring means, in order to determine the possible straightness error of the bar.

15 Claims, 3 Drawing Sheets

(58) Field of Classification Search
USPC .................................................. 356/399–401
See application file for complete search history.

(56) References Cited

U.S. PATENT DOCUMENTS

| | | | | |
|---|---|---|---|---|
| 5,289,261 | A * | 2/1994 | Yogo | G01B 11/2545 |
| | | | | 250/559.24 |
| 9,327,488 | B2 * | 5/2016 | Taniguchi | B41F 1/16 |
| 10,371,517 | B2 * | 8/2019 | Kavousian | G01B 5/25 |
| 2004/0184650 | A1 * | 9/2004 | Ciani | G01B 11/25 |
| | | | | 382/141 |
| 2006/0139658 | A1 * | 6/2006 | Uetani | G01B 11/24 |
| | | | | 356/601 |
| 2007/0028681 | A1 * | 2/2007 | Goforth | G01B 17/02 |
| | | | | 73/159 |
| 2008/0316501 | A1 * | 12/2008 | Hirata | G01B 11/24 |
| | | | | 356/601 |
| 2010/0088043 | A1 * | 4/2010 | Weiss | G01M 7/00 |
| | | | | 702/41 |
| 2017/0284798 | A1 | 10/2017 | Kavousian | |
| 2019/0120616 | A1 * | 4/2019 | Bomba | G01B 5/0009 |
| 2020/0122221 | A1 * | 4/2020 | Bomba | B23Q 7/048 |

FOREIGN PATENT DOCUMENTS

| | | |
|---|---|---|
| JP | S6171307 A | 4/1986 |
| JP | 2005300298 A | 10/2005 |
| WO | 2006138228 A1 | 12/2006 |

\* cited by examiner

METHOD AND APPARATUS FOR MEASURING THE STRAIGHTNESS ERROR OF SLENDER BODIES, WITH COMPENSATION OF GRAVITY DEFORMATION

FIELD OF THE INVENTION

The present invention generally concerns the measurement apparatus sector and, in particular, a method and apparatus for measuring straightness errors of elongated-shape elements, typically shafts, bars or tubes. Preferably, it concerns elements made of metal materials and the measurement occurs during their production cycle.

STATE OF THE ART

In the bar production sector, in particular of metal material, and more specifically in the drawing of brass, aluminum and steel, there are known methods for measuring the straightness of finished product and to determine the presence of possible straightness errors of bar-shaped products and the like, also named deflection. In other words, it is necessary to detect if the bar under examination has any straightness errors, i.e. is not straight but has one or more curvatures along its longitudinal axis, and to measure these errors in order to determine whether or not the bar complies with the predefined qualitative standards.

According to a traditional method, the straightness error is measured by placing the bar under examination on two bearings, making it rotate by 360° and measuring, by means of a comparator, at the level of a selected section typically halfway between the two bearings, the maximum camber variation of the point corresponding to the upper generatrix. The value measured must then be divided by two. The basic measure is given by the distance from the bearing. Although very accurate and not intrinsically affected by the measurement errors caused by deformation due to the force of gravity acting on the bar, it is very slow and therefore unsuitable for being implemented on the production line, where the cycle times are too short; in particular, the current processing plants, for example in the brass sector, process bundles at a speed of about 60-120 m/min, therefore producing finished bars of a length of 3 to 5 m at a frequency of one bar every 1-3 seconds. However, the aforesaid technique requires much longer measurement times and is therefore only traditionally used to check samples next to the line.

Over time, other systems were developed to measure the waviness of the material on the line; these systems use one or more laser sensors that measure the distance between the bar and a known reference plane and thus determine some waviness indexes of the bar itself. However, these systems are designed to detect the waviness of the material before it is cut into bars and are, therefore, not often used, or even unused, once the production speed is increased, due to material deformations and oscillations caused by the speed and drive system; moreover, these systems measure the material before it is cut into bars and subjected to a longitudinal traction force, therefore neither considering the effect of the cutting process on the finished product nor providing indications with regard to the effect of the residual stress in the material, which can deform the bar following the cutting process.

Other measurement systems, used to estimate the curvature of the material, use multiple contact sensors coupled to an apposite rolling surface, but are disadvantageously only usable under well-controlled measuring conditions and difficult to adapt to the measurement of bars with sections that are not round; moreover, these systems often involve measurement errors caused by, for example, friction and unpredictable rolling of the material, mechanical adjustments or wearing of the components; therefore, also these systems are not very effective in carrying out dimensional checks on the production line. Moreover, these systems measure the magnitude of the straightness error of the material, but these measures are always indirect and unable to accurately provide the effective measure of the straightness error of the material.

Devices using optical sensors were also proposed, but these do not, however, provide satisfactory results in terms of the precision and accuracy of the measurement carried out; in particular, all of the currently known solutions proposed do not provide a compensation of the measurement errors intrinsically caused by the deformation of the bar generated by the force of gravity acting on the bar itself, errors which can progressively become very significant for materials that gradually become thinner and more flexible.

For example, the document WO2006138228 A1 concerns an apparatus for measuring the straightness errors of bars and which provides to acquire a sequence of couples of images next to at least three different sections of a bar, in order to estimate the position of the center of each section. Preferably, the couple of images are acquired from directions orthogonal to one another, or anyhow angled between one another. In any case, it is necessary to have a couple of sensors at each section of the bar to be measured, which requires the presence of a high number of measuring sensors, at least six sensors in a minimum configuration and without achieving a particularly accurate measurement. Moreover, the presence of only two measures for each section does not allow to obtain a particularly accurate estimate of the real center position of the bar section analyzed; moreover, the determination of this center is only accurate in case of circular bodies, the measurement being essentially based on a shadow projection and not on the effective survey of the geometry of the section of the material. Moreover, the system does not provide any compensation of the effects of gravity on the bar, and is therefore extremely inaccurate in case of slender bodies with geometries that can be easily deformed only by the force of their own weight.

The document JP 56171307 A concerns a system for measuring the curvature of a material to be measured, supported cantileverly by a couple of rollers, through at least three couples of distance detectors arranged at predetermined distances in the longitudinal direction of the material. The curvature of the material to be measured is calculated according to the distances detected by these sensors. In addition to presenting the same problems of the apparatus according to the document WO2006138228 A1, the fact that the tube is cantileverly restrained can cause further bending of the tube due to its weight. Moreover, this system can measure straightness defects in only one direction and is completely unsuitable for being used on the production line.

Finally, the document EP1447645 A1 concerns a device for checking the straightness of elongated elements, such as bars, on the basis of a comparison of images detected by at least two detectors. For the operations of this system, it is necessary to compare the images detected with the images acquired by the same device in case of a bar of reference, which is presumed to be devoid of straightness errors. The system cannot therefore detect if the bar of reference is effectively devoid of straightness errors; moreover, such a system is not very flexible given the necessity to have the image of a corresponding bar of reference in order to be able to evaluate a bar.

More recent solutions, such as the one proposed in the patent application n. EP3093611A2 of the same applicant, have addressed the problem linked to the compensation of the effects of gravity by acting mainly mechanically, by means of a bar supporting system, to try to apply counterthrusts to the slender body under measuring and which are able, within certain limits, to balance the deformation caused by the force of gravity acting on the bar itself. However, these solutions still have practical use limitations and, more specifically, require an often not so easy configuration of the bar supporting system on the basis of the length of the body to be measured; moreover being based on a thrust and counterthrust equilibrium system on the bar, therefore requiring rather long adjustment times before reaching the equilibrium required to carry out the measurement. Therefore, these may not always be compatible with the cycle times available in the continuous cycle production plants.

Other systems provide the use of weight detection means.

Specifically, the US patent application n. US 2017/284798 A1 concerns a device for measuring the straightness of a shaft-shaped piece and which includes a support for the piece, wherein the support has more sections. Each section has a supporting surface provided with a force sensor to measure the force the piece applies on the supporting surface in a direction essentially extending transversely with respect to the gravity acceleration, so that to move the supporting section in order to compensate the weight of the piece.

The document JP 2005 300298 A, on the other hand concerns a tool for measuring the curvature of a bar, having a plate with a flat surface and a plurality of frames combined with the plate and spaced at a given interval. The shaft to be measured is arranged on the frames and is rolled in order to carry out the measurement of the curvature.

OBJECT AND SUMMARY OF THE INVENTION

The present invention was conceived with the object to overcome the drawbacks of the previously described known art, by proposing an apparatus and relative method to detect and measure the straightness error of slender bodies once they are cut into bars, shafts and tubes of variable length and the like, and which can be used directly on production lines, for example of the drawing, rolling, extrusion, etc. type.

Another object is to propose an apparatus and a method adapted for the measurement of the straightness error of slender bodies of any geometric sections, for example, round, hexagonal, flat, etc. and of any length.

Another object is to provide an apparatus and a method able to compensate the deformation of the slender body, generated by the force of gravity acting on the body itself.

Still a further object is to propose an apparatus and a method allowing extremely reduced measurement times, in virtue of the total absence of mobile and/or tilting and/or floating mechanical elements in support of the bar.

These objects are achieved with an apparatus for measuring the straightness errors of slender bodies, such as bars, shafts, tubes, etc., named bars in short, according to claim 1.

In particular, the measuring apparatus comprises a bar supporting system having a plurality of bearing elements, which remain static during the measurement cycle of each bar and on which the bar is arranged, so that to stably remain in static equilibrium during the measurement cycle, a first detecting system to detect the tridimensional geometries of the bar, a second detecting system to detect the forces acting on the bar, acquiring means to acquire at least one physical parameter of the bar under measuring each time and a control and processing unit receiving and processing the data acquired by said detecting systems and acquiring means. The supporting system is, therefore, static during the measuring step of the bar; in other words, the supports are not subject to any translatory motion during each measurement. Moreover, they can be translated one with respect to the other between different measurement cycles, for example for being arranged at a distance compatible with the length and size of the bar itself. Moreover, and preferably, the supporting system is not subject to oscillations and is not, anyhow, tilting. Measurement cycle means all of the steps necessary to carry out a straightness measurement of a single bar.

Preferably, the means for acquiring at least one physical parameter of the bar are combined with means for storing said parameter and are specifically structured to acquire and store at least the elasticity module of the bar under measuring. These means could be adapted to acquire and store other parameters, such as the size, theoretical shape, type of material and density of the material of the bar being measured each time.

Preferably, the means for acquiring a physical parameter of the bar comprise an interface having means to enter the piece of data or data of interest. This data can be manually entered by a user or sent to the acquiring means by the same bar production plant upstream of the measuring apparatus, depending on the type of bar being produced each time.

In alternative or in addition, the means for acquiring at least one parameter can comprise physical means adapted to detect and obtain the parameter of interest starting from the bar itself. In a particularly preferred implementation, said means can comprise an element adapted to cause deformations in the bar and calculating means to obtain the stiffness constant of the bar on the basis of the deformations caused. The deformation of the bar can be obtained by moving at least one supporting element of known quantities, for example before carrying out the measurement, and by measuring the different deformations on the basis of the variation of the position of the supporting element in order to obtain the stiffness constant.

Advantageously, the first detecting system acquires the coordinates of a plurality of points on the bar surface next to a plurality of cross sections of the bar itself. The control and processing unit is programmed to calculate the position of the effective geometric center of each section detected, starting from the coordinates of the aforesaid points. Preferably, the first detecting system acquires the coordinates of the points next to at least three different sections of the bar. In a particularly preferred solution, the positions of the supporting elements of the bar, referred to the coordinates system typical of the system detecting the development of the longitudinal axis of the bar, are also acquired.

Preferably, the second detecting system measures the forces the bar applies to each of the bearing elements, which act as constraints of the position of the bar itself and, in particular, the modulus and the direction of the force applied to the bar next to each of these bearing elements.

From the geometrical development of the longitudinal axis of the bar, obtained by the first detecting system described above, by the vectors of the forces measured by the second detecting system in each of the constraint positions of the bar and once the value of at least one physical parameter of the bar is known, the central control unit of the apparatus is able to estimate the effective geometry of the bar if any different field of force is applied to the bar, and, specifically, also in the absence of applied external forces, including the force of gravity determined by the mass of the bar itself; from this estimated geometry of the bar, the data acquiring and processing module can calculate the effective non-straightness error of the bar being measured.

The first detecting system comprises one or more sensors, preferably of the optical type, which can be moved along the longitudinal axis of the bar to acquire the coordinates of the points next to at least three different sections of the bar along its longitudinal axis; otherwise at least three optical sensors are provided, each arranged next to a different section of the bar along its longitudinal axis. The sensors can be stationary or movable in parallel to the supporting system of the bar and to the longitudinal axis of the bar. Preferably, at least three movable sensors are provided to carry out a more effective detection of the geometry of the bar.

The optical sensors used belong to the class of optical triangulation systems using laser or other light type, or of any measuring sensor able to detect the two-dimensional and/or tridimensional geometrical profile of the bar, for example measuring systems projecting structured light, time of flight cameras, stereoscopic vision systems etc.

At least one guide, along which the mobile sensors can be translated in known positions by means of respective actuators driven by the control unit, is provided for the straightness movement of the optical sensors. In alternative, the sensor or sensors are combined with the guide in a fixed way and the guide itself is translated by means of a relative motorization. The guide can also be stationary and acts as a support for stationary sensors.

The second detecting system, having the task to measure the forces the bar applies to each of the bearing elements, comprises a plurality of second sensors belonging to the class of force transducers, known as load cells and which can be biaxial transducers or combinations of monoaxial load cells.

Advantageously, the measuring device can be arranged in line with a bar production plant. In this case, the central control unit has means to interface with the production plant so that to feedback adjust the production parameters on the basis of the straightness error each time detected on the bars.

A further aspect of the invention concerns a method according to claim 12 for measuring the straightness errors of elongated-shape elements, named bars, and which provides to position a bar on a supporting system so that to arrange it in a position of static equilibrium, i.e. still, during the measurement cycle, with its longitudinal axis arranged according to the constraints imposed by the bearing elements of the supporting system; to acquire and store at least one physical parameter of the bar, preferably at least the stiffness constant of the bar; to detect, by means of the first detecting system, the coordinates of a plurality of points on the bar surface next to at least three cross sections thereof; to detect, by means of the second detecting system, the vector of the forces the bar applies next to each of said bearing elements; to calculate the coordinates of the longitudinal axis of the bar next to the at least three cross sections, on the basis of the coordinates detected; to enter the conditions detected in a suitably developed system model and which comprise the geometry of the bar detected, the forces detected on the bearing elements and the at least one physical parameter acquired for the bar under measuring, in order to estimate the effective shape of the bar itself, corresponding to the geometrical development it should have in the absence of gravitational field and supporting constraints; to use this estimated geometry to determine the straightness error of the bar as a deviation of the theoretical axis constituted by one or more suitably defined lines of reference.

Advantageously, the second detecting system measures the forces the bar applies to the supporting system. In fact these forces, partly due to the weight of the bar that is transferred to the bearing elements and partly possibly caused by the arrangement of the supporting elements, cause a temporary deformation of the bar, which disappears once the constraints that have generated it have been eliminated and which is added to the real deformation of the bar itself. The measuring method therefore provides to detect these forces, to calculate the deformation caused by them on the basis of the stiffness constant of the bar and to subtract it from the total deformation detected by the first detecting system so that to obtain the effective measure of the deformation of the bar itself. Therefore, the method can compensate, i.e. eliminate from the final measurement, the straightness errors induced on the bar by the supporting system, so that to provide the straightness error measurement generated only by the production process of the bar.

Advantageously, in the absence of applied forces, the geometry of the bar is estimated by means of the so-called "elastic curve method", applicable to slender deformable bodies of the type considered herein, i.e. to bodies having a length greater than about six times their diameter; this method refers to an elastic constitutive beam model, which allows to describe the field of transverse movements of the bar depending on the deformed configuration assumed by the axis line of the beam. According to this method, the amount of the deformation of the portion of the bar comprised between two supporting points depends on various parameters, such as the stiffness constant, or Young constant, and the distance between the supporting points.

Preferably, by way of example and without limitations and constraints, the straightness error can be determined as the distance between two parallel lines, one of them passing through the centers of two cross sections and the other one passing through the center, in-between the preceding two centers, of a third cross section. The greater the number of centers, i.e. the greater the number of cross sections detected for the bar, the more reliable the reconstruction of the pattern of the longitudinal axis of the bar and the more accurate the error calculation. The straightness error can be measured on the entire length of the bar, or only on one or more portions of interest; the analysis can in fact be repeated several times on adjacent portions of the bar in order to determine a local non-straightness, such as required by certain regulations of the sector.

Advantageously, the bars can be classified on the basis of the amount of the straightness error measured and might be unloaded by the supporting system on different lines on the basis of the amount of the error.

BRIEF DESCRIPTION OF THE DRAWINGS

However, the invention will be further illustrated in the following of the description made in reference to the accompanying indicative and not limitative drawings, in which.

DETAILED DESCRIPTION OF THE INVENTION

In said drawings, 1 globally denotes a device for measuring the straightness errors of an elongated-shape element, such as a bar, shaft, tube and the like, hereinafter simply named bar 2. The bar can have a section of any geometry, for example circular, hexagonal, squared, etc., of any size and any material, preferably metal.

Figure 1:
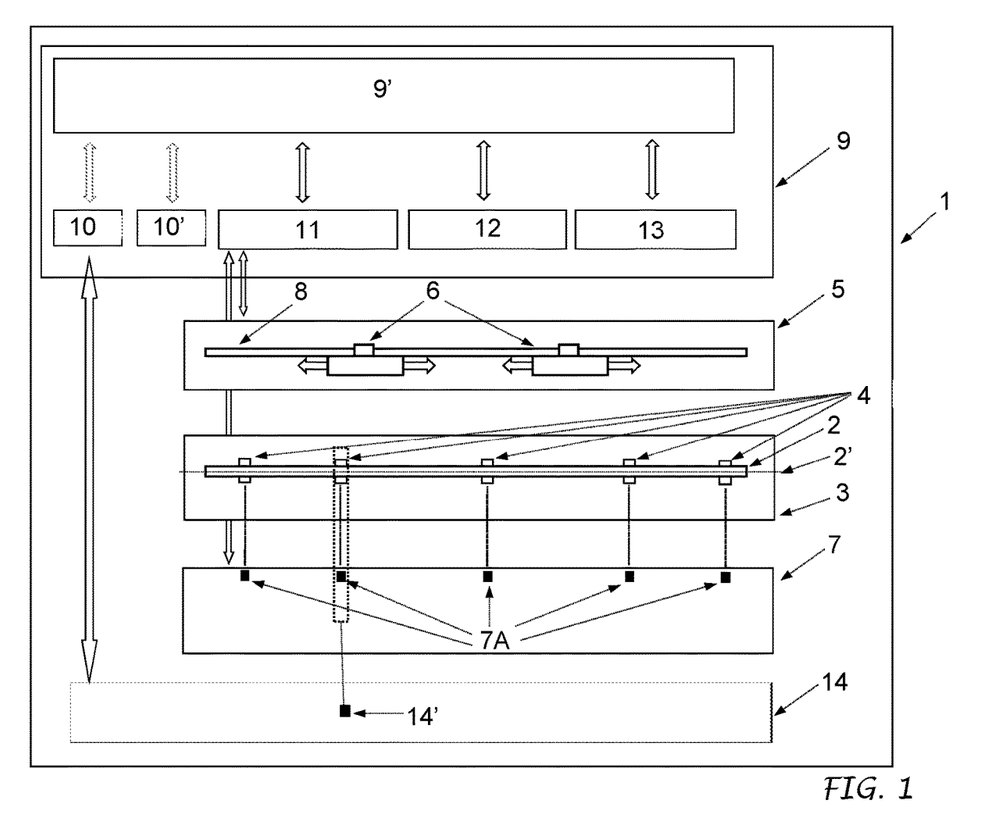
FIG. 1 shows a block diagram of the measuring device.
Figure 2:
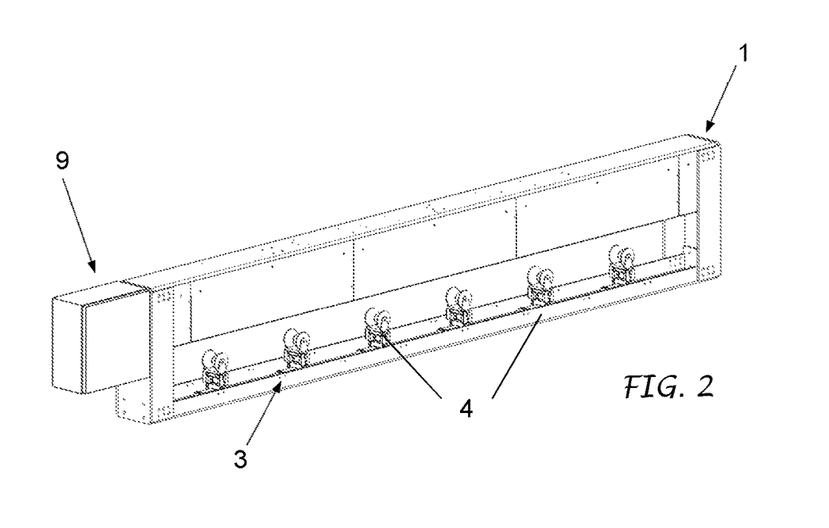
FIG. 2 shows a perspective view of an embodiment of the measuring device according to the invention.

As schematically shown in FIG. 1, the measuring device 1 comprises:

- a supporting system 3, which remains static during the measurement cycle of each bar, for supporting the bar and composed of a plurality of fixed bearing elements 4 on which the bar under measuring is arranged. The bearing elements can be moved between one measurement and another whenever necessary;
- a first detecting element 5 to detect the development of the longitudinal axis of the bar 2 and comprising one or more first sensors 6, preferably optical sensors, for detecting the tridimensional geometry of the bar under measuring.
- a second detecting system 7 to detect the forces acting on the bar and comprising a plurality of second sensors 7A combined with each bearing element 4, which are adapted to detect modulus and direction of the forces the bar applies to each of said bearing elements; these second sensors can be of the load cell type, each combined with a relative bearing element, individually or in combination with others for greater measurement accuracy. In a preferred embodiment shown in FIG. 3*a* and 3*b*, two or even more preferably three of said second sensors 7A are combined with each bearing element in order to increase the accuracy of the measurement.

Figure 3A:
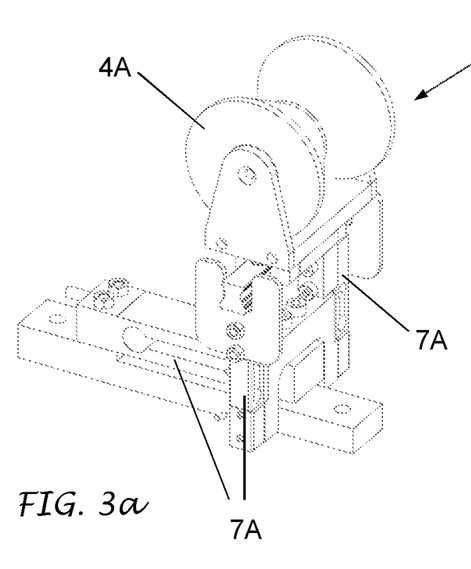
FIGS. 3a and 3b show respective perspective views from different directions of an element of the measuring device in FIG. 2.
Figure 3B:
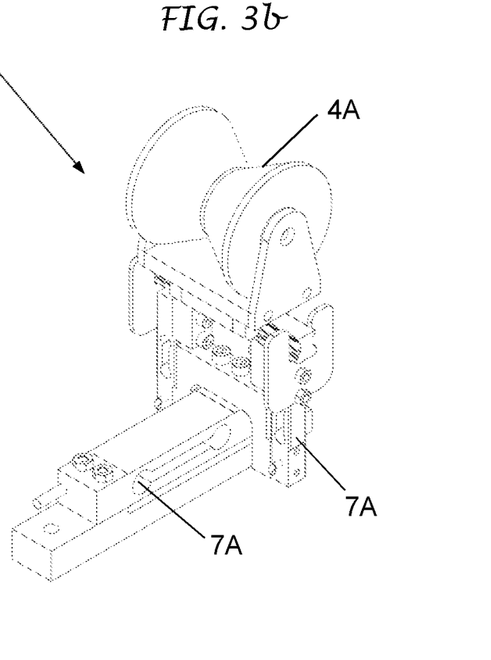

Each of the bearing elements 4, together with the relative at least one sensor of said second sensors 7A, can be mounted in the supporting system 3 so that to be moved and arranged in a different position on the basis of the bar under measuring.

Preferably, the bearing elements 4 each comprise a relative supporting roller 4A so that the bar is free to run in a longitudinal direction in the supporting system, in order to assume a position completely free from and devoid of forces with longitudinal component.

The first sensors 6 can be positioned in a fixed geometric configuration with respect to the supporting system 3 of the bar, or in a mobile configuration by means of a suitable motorized linear guide 8 able to translate the sensors in parallel to the bar itself.

Moreover, the measuring apparatus comprises a central control unit 9 provided with a data acquiring and processing module 9', with acquiring means 10 to acquire at least one physical parameter of the bar and with storage means 10' to store the detected physical parameters of the bar. Advantageously, the acquiring and storage means allow to acquire and store at least the stiffness constant, or Young constant, of the bar under measuring.

The data acquiring and processing module 9' acquires the data detected by the first detecting system, by the second detecting system and by the acquiring means and processes them to measure any straightness error of the bar.

Figure 5:
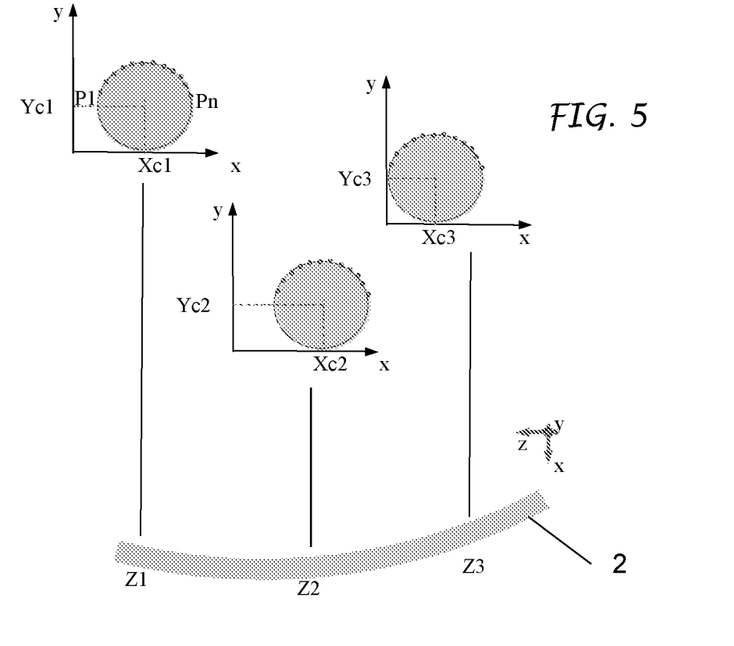
FIG. 5 shows an example of a first non-straightness error calculating step.

The first detecting system 5, to detect the development of the longitudinal axis 2' of the bar 2, is adapted to acquire the coordinates of a plurality of points P1, P2, . . . Pn of the bar surface next to each of at least three cross sections Z1, Z2, . . . , Zn of the bar itself, as shown in FIG. 5. To this end, the first detecting system 5 can comprise at least one of said first sensors 6, preferably a movable optical sensor, to acquire the coordinates of the points of the bar surface next to at least three cross sections, or at least three of said first sensors, each of the optical type and each of which positioned next to a respective cross section Z1, Z2, . . . , Zn. These optical sensors can be mounted stationary or movable in parallel to the supporting system of the bar, in the direction of the longitudinal axis of the bar.

As shown in the figures, each optical sensor can be positioned on the opposite side of the bar with respect to the supporting system 3, therefore above the bar and facing it, even though different configurations in which the sensors are positioned differently with respect to the supporting system are not to be excluded, as long as they are facing the bar. Preferably, there are three optical sensors 6, each movable in parallel to the supporting system 3 so that to be able to acquire the coordinates of the surface points of a plurality of cross sections.

The optical sensors are selected among the class of the optical triangulation systems with laser or other light type, or any other measuring sensor able to detect the two-dimensional and/or tridimensional geometrical profile of the bar, such as, for example, measuring sensors projecting structured light, or time of flight cameras, or stereoscopic vision systems, etc.

As anticipated, the first detecting system 5 to detect the development of the longitudinal axis of the bar is provided with at least one straightness guide 8 to which at least one optical sensor 6 is integrally fastened. Preferably, the guide can be translated, by means of suitable motorization means, substantially in a parallel direction with respect to the longitudinal direction of the bar, so that to position the optical sensor 6 next to successive sections of the bar. Preferably, a single straightness guide 8 is provided and combined with a single sensor, or two or more sensors spaced and arranged in predetermined positions. In alternative, a fixed or translatable guide can be provided for each optical sensor.

The central control unit 9 is able to exchange data towards the first sensors 6 and second sensors 7A, respectively of the first detecting system 5 and second detecting system, by means of a first interface system 11, towards the system operator by means of a second interface system 12, and towards the production plant of the bars—not shown—by means of a possible third interface system 13.

The acquiring means 10 can comprise an interface that allows to enter the values relative to at least one physical parameter of the bar and, specifically, the value of the Young constant of the bar under measuring. These values can be entered by a user, by means of suitably prearranged entering means—not shown—, or can be directly received by the production plant of the bars, which updates the measuring apparatus according to the type of bar being produced. In the first case, the interface can coincide with the second interface system 12, while in the second case, it can coincide with the third interface system 13. In case of manual entering, to facilitate the operation, the acquiring and storage means can also acquire and store libraries of different types of bars, comprising all of the physical parameters necessary to allow the user to select among them in order to set the bar under measuring.

In alternative or in addition, the acquiring means can be combined with the detecting system 14 able to cause a temporary deformation in the bar. Specifically, the detecting system can comprise at least one actuator 14' to move of known quantities at least one bearing element before or after the measurement cycle of the bar. This way, the distance between the at least one bearing element and another bearing element is varied, therefore inducing temporary deformations of the bar portion comprised between the two bearing elements. Following the variation of the distance, the measurement of these temporary deformations allows to obtain the value of the stiffness constant of the bar under measuring. Each bearing is then maintained stationary during the measurement cycle.

According to a further embodiment method—not shown—the detecting system can be structured to deform the bar, for example by applying a force in a portion of the bar, comprised between two adjacent bearing elements, so that to deform it of a predetermined quantity, or by applying a known force. The stiffness constant of the bar is calculated by program means on the basis of the deformations obtained after having applied a given force, or on the basis of the force applied to obtain a predetermined deformation.

As a whole, the measuring apparatus 1 is structured to process the coordinates of the points detected, the forces detected and the physical parameters of the bar acquired in order to extract information relative to the straightness error of the bar. The measuring apparatus is also able to communicate this result to the production plant, for rejecting any bar and/or for driving any feedback adjustment rings for the processing of the successive bars and/or for driving possible processing systems downstream of the measuring device, which are dedicated to straighten the bar on the basis of the error calculated.

The invention also concerns a method for measuring the straightness errors of bars by means of the device 1 as described above.

Figure 4:
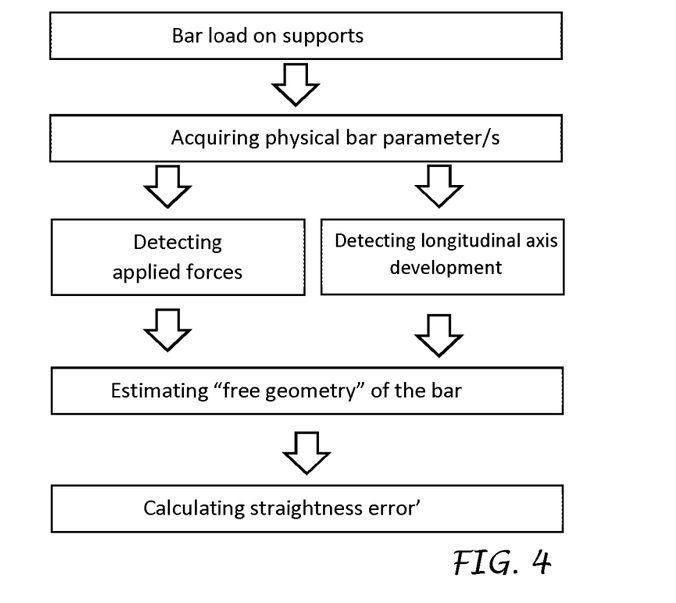
FIG. 4 shows a block diagram of the measurement cycle.

Each measurement cycle carried out to measure a bar is represented in the scheme of FIG. 4 and can be described as follows: the measurement cycle starts with the positioning of the bar 2 on the supporting system 3 and with the acquisition of at least one physical parameter of the bar, at the end of which the central control unit 9 drives all devices necessary, in particular the first 6 and second sensors 7A to respectively detect the tridimensional geometry of the bar arranged on the supporting system and the vector of the forces applied on each bearing element 4; the measurement data acquired and detected in this way are processed by the data acquiring and processing module 9' to calculate the straightness error of the bar and to communicate this result to external systems for the successive rejection/straightening steps of the bar detected. The step of acquiring at least one physical parameter of the bar could also be carried out at the end of the measurement cycle, or well before the positioning of the bar, whenever the physical parameter were to be entered by interface means.

Specifically, the data relative to the physical parameters of the bar, to the forces exerted by the bar on each bearing element and to the tridimensional geometrical development of the bar, obtained by processing the data detected by the optical sensors, is used to estimate the geometrical profile that the bar under measuring would have in the absence of deformations caused by external constraints, i.e. in the absence of supporting constraints and in the absence of weight force generated by the mass of the bar itself. The geometrical profile estimated in this way is then used to detect and calculate the amount of possible straightness errors of the bar under measuring.

The cycle ends with the unloading of the bar from the supporting system in order to continue with a possible measurement cycle of a successive bar.

More specifically, the calculation of the non-straightness error of the bar itself is carried out starting from the geometrical data of each section $Z1, Z2, \ldots Zn$, and, in particular, of the coordinates of the points $P1, P2, \ldots Pn$ of each of said sections, as acquired by the first detecting system 5, by the vectors of the forces, as acquired by the second detecting system 7 of the forces acting on the bar and by at least one physical parameter of the bar, acquired by the acquiring means 10.

The real calculation process is developed in three steps:

(i) initially, the calculation unit determines the theoretical deformation that a bar of the same size and with the same physical/mechanical characteristics as the bar under measuring, and initially assumed perfectly straight, would assume if subjected to the same constraints and to the same force field to which the bar under measuring is subjected; this force field is known in discrete positions, since it is measured by the second sensors 7A next to all of the bearing elements of the bar. Once the physical parameters of the bar and, in particular, its stiffness constant are known, the deformation is determined by applying the so-called "elastic curve" method to the bar, known per se and documented in the physical-engineering discipline as "building science;" this method is applicable with precision to the slender bodies object of the invention that are subject to deformations. "Slender bodies" means bodies characterized by having a length that is about six times greater than their diameter, or, anyhow, their own section;

(ii) Successively, the central control unit 9 subtracts the theoretical deformation calculated in the preceding step from the real geometry of the bar, as measured by the specific first detecting means 5, estimating in this way the free geometry of the bar, wherein "free geometry" of the bar means the geometry that the bar would have in the absence of applied external forces, and therefore specifically also in the absence of the force of gravity. The estimation of the free geometry of the bar carried out in this way is extremely reliable since, in practical cases of interest for the purpose of the present system, the side deformations, with respect to the overall length of the bar, are very small. This allows to apply with precision the hypothesis of overlapping effects when determining the overall deformation of the bar; this hypothesis sees the overall deformation as an overlapping of a "free geometry" of the bar itself, i.e. the geometry assumed by the bar in the absence of applied external forces and possibly affected by its non-straightness error, added to the deformation caused by the external force field applied to the bar itself.

(iii) Finally, starting from this free geometry of the bar estimated in the preceding step, the processing unit calculates the effective non-straightness error by applying different calculation methods depending on the different standards and/or regulations of the different sectors of application. For example, the coordinates of the centers $C1, C2, \ldots, Cn$ in the X-Z plane of FIG. 5 can be used to determine the maximum deviation of the effective coordinates of the centers with respect to the line interpolating to the least-squares defined by all the same centers evaluated on the entire length of the bar or only on one or more portions of the bar of interest, in order to determine a local non-straightness, as required by certain regulations of the sector.

It is, however, possible to use different methods for calculating the non-straightness error; for example, it is possible to determine this error by carrying out an interpolation of the centers at an theoretical arc of a circle and to successively determine some invariants of this arc, such as, for example, the maximum deflection normalized to the length of the bar, or to the squared length of the bar, such as is practice in certain applicative sectors, for example the brass bar sector.

Once the calculation cycle of the non-straightness error of the bar has been completed, the central control unit is programmed to classify the bars on the basis of the amount of this error and to possibly unload them from the supporting system onto different routing lines depending on predefined error thresholds.

Advantageously, in the first calculating step illustrated above, the first detecting system 5 is able to automatically provide detailed information on the characteristics of the bar under measuring to the calculation model, including the effective geometry of each individual section, its orientation and its position, with respect to the supporting constraints of the bar, and the overall length of the bar.

In the second calculating step, the data acquiring and processing module 9' is advantageously able to determine the development of the longitudinal axis of the bar, starting from the coordinates detected for the multiplicity of measurement points $P_1, P_2, \ldots P_n$ acquired next to each measurement section $Z_1, Z_2, \ldots Z_n$, longitudinal to the bar; these points are used to carry out a least-squares interpolation with a model of reference of the section of the bar, a circumference in the example shown, and to thus determine the coordinates Xc, Yc of the center $C_1, C_2, \ldots, C_n$ of each cross section. The number of sections that will be used can vary between a minimum of three sections up to a higher number in order to improve the measurement precision, compatibly with the measurement times available, depending on the bar production frequency.

Figure 6:
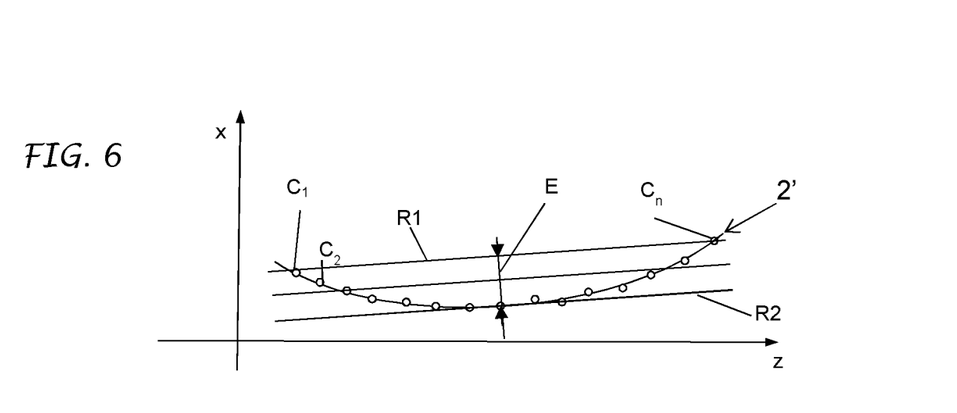
FIG. 6 shows an example of a second non-straightness error calculating step.

FIG. 6 shows an example of the positions of the centers $C_1, C_2, \ldots, C_n$ of the cross sections detected in a Cartesian reference system X, Z combined with the supporting system. In particular, a calculation method of the error that provides to calculate the straightness error E as a distance between two parallel lines is shown, of which a first line $R_1$ passing through the centers of two cross sections and a second line $R_2$ passing through the center of a third cross section, in-between the two preceding centers.

This method can advantageously be applied for the determination of the development of the longitudinal axis of the bar also in the presence of a bar with geometrically complex cross sections and anyhow different than the circular one.

The invention claimed is:

1. Measuring apparatus to measure straightness errors of elongated-shape elements, named bars, comprising:
a supporting system static during a measurement cycle of each bar and on which a bar to be measured is arranged and remains stable during said measurement cycle,
a first detecting system to detect the development of the longitudinal axis of the bar, which comprises one or more first sensors to detect a tridimensional geometry of the bar under measuring,
a second detecting system to detect the forces acting on the bar, wherein said second detecting system comprises a plurality of second sensors to detect the forces the bar applies on the supporting system,
a central control unit and
acquiring means to acquire physical parameters of the bar under measuring, said physical parameters being able to determine an elasticity module of the bar,
wherein the central control unit comprises at least one data acquiring and processing module provided with program means to acquire and process the data detected by said first and second detecting systems and acquired by said acquiring means in order to determine the possible straightness error of the bar,
wherein the first sensors are optical sensors and the detecting means to detect the development of the longitudinal axis of the bar comprise:
at least one optical sensor and means to position it next to three different sections of the bar along the longitudinal axis thereof; or
at least three stationary optical sensors each arranged next to a different section of the bar along the longitudinal axis thereof,
and wherein the program means are programmed to estimate the geometry of the bar in the absence of applied forces using a modeling of the theoretical deformation of the bar in accordance with the elastic curve method, which can be applied to deformable slender bodies, on the basis of the values of the physical parameters acquired by the acquiring means and of the forces acquired by the second detecting system, and for subtracting such geometry of the bar from the development of the longitudinal axis of the bar, detected by the first detecting system, in order to determine any real straightness error of the bar.

2. The measuring apparatus according to claim 1, wherein the supporting system comprises at least two bearing elements to bear the bar under measuring, each of them being combined with at least one of said second sensors and wherein said second sensors detect the modulus and the direction of the forces the bar applies to each of said bearing elements of said supporting system.

3. The measuring apparatus according to claim 1, wherein said acquiring means comprise an interface provided with entering means to allow the entering of said physical parameters of the bar.

4. The measuring apparatus according to claim 1, wherein said acquiring means comprise a detecting system to detect said physical parameters of the bar, said detecting system being adapted to cause a deformation in the bar, and calculating means to calculate the elasticity module of the bar based on the deformation of the bar caused by the detecting system.

5. The measuring apparatus according to claim 4, wherein the supporting system comprises at least two bearing elements, wherein said detecting system comprises at least one actuator able to move at least one of said bearing elements so that to notably vary a distance with respect to another of said at least two bearing elements and wherein the stiffness constant is obtained by the calculating means by processing the measures of the different deformations of the bar on the basis of the variation of said distance.

6. The measuring apparatus according to claim 1, wherein the first detecting system acquires the coordinates of a plurality of points of the bar surface next to at least three cross sections and said data acquiring and processing module is programmed to calculate the position of the longitudinal axis of a bar next to said three sections, starting from the coordinates of said plurality of points.

7. The measuring apparatus according to claim 1, wherein the optical sensors detecting the two-dimensional and/or tridimensional geometrical profile of the bar are selected from: optical triangulation lasing sensors, measuring sensors projecting structured light, time of flight cameras, stereoscopic vision systems, and/or any measuring device adapted to detect a plurality of coordinates of points belonging to the surface of the bar under measuring.

8. The measuring apparatus according to claim 1, further comprising movement means to move the first sensors, which in turn comprise at least one guide by which one or more of said first sensors can be translated through apposite actuators driven by the central control unit, along the longitudinal direction of the bar.

9. The measuring apparatus according to claim 1, wherein said second sensors to detect the forces are directly integrated in the same bearing elements and comprise:
- at least one biaxial force sensor coupled to each bearing element; or
- at least two monoaxial force sensors coupled to each bearing element and able to detect the whole force vector the bar applies to said bearing elements.

10. The measuring apparatus according to claim 1, arranged in line with a bar production plant, wherein the central control unit is interfaced with the outside bar production plant in order to feedback adjust the production parameters on the basis of the straightness error each time detected on the bars.

11. Measuring method to measure the straightness errors of elongated-shape elements, named bars, by a measuring apparatus comprising a supporting system static during the measurement cycle, on which the bar to be measured is arranged, a first detecting system to detect the development of the longitudinal axis of the bar, a second detecting system to detect the forces acting on the bar and combined with said supporting system, acquiring means to acquire the values of the physical parameters of the bar under measuring, said physical parameters being able to comprise an elasticity module of the bar, and a central control unit, the method comprising the steps of:
- a) positioning a bar on the supporting system so that it is arranged in a position of static equilibrium;
- b) acquiring the values of the physical parameters of the bar by the acquiring means;
- c) detecting, by the second detecting system, the vector of the forces the bar applies to the supporting system;
- d) detecting, by the first detecting system, the coordinates of a plurality of points of the surface of the bar next to at least three cross sections of the bar;
- e) calculating the coordinates of the longitudinal axis of the bar next to said at least three cross sections, on the basis of the detection of step d);
- f) using the data detected by said first and second detecting systems and the values of the physical parameters of the bar detected by the acquiring means to estimate the geometry of the bar in the absence of applied forces;
- g) determining any real straightness error of the bar, on the basis of the data detected by said first and second detecting systems and of the geometry of the bar estimated in step f), so that the error is not influenced by the constraints of the supporting system;

wherein step f) provides for using a modeling of the theoretical deformation of the bar in accordance with the elastic curve method, which can be applied to deformable slender bodies, on the basis of the values of the physical parameters acquired in step b) and of the vector of the forces applied detected in step c) and for subtracting such theoretical deformation from the deformation calculated in step e) to determine any real straightness error of the bar.

12. The measuring method according to claim 11, wherein the supporting system comprises at least two bearing elements the second detecting system is combined with, to detect the forces the bar applies to each bearing system.

13. The measuring method according to claim 11, wherein, by adopting a Cartesian reference system X,Y,Z integral with the bar under measuring whose system origin is positioned in the center of the first section of the bar and Z axis is oriented along the direction of the longitudinal axis of the bar:
- step d) provides for acquiring the coordinates X, Y of a plurality of points of the bar surface, in each of at least three sections along the axis Z;
- step e) provides for carrying out a least-squares interpolation of coordinates of points with a reference model of the bar section, to determine the coordinates of the center of each cross section, i.e. the position of the bar axis in at least three cross sections;
- step g) provides for calculating the straightness error as a distance between two parallel lines, one of them passing through the centers of two cross sections and the other one passing through the center, in-between the preceding two centers, of a third cross section.

14. The measuring method according to claim 11, wherein the data relative to the real straightness error each time detected on the bars, is sent to a bar production plant in order to feedback adjust the production parameters.

15. The measuring method according to claim 11, wherein the bars are classified on the basis of the amount of the measured straightness error and, in case, they are unloaded from the supporting system on different lines on the basis of the error amount.

* * * * *